(12) United States Patent
Wang et al.

(10) Patent No.: US 10,430,802 B2
(45) Date of Patent: Oct. 1, 2019

(54) SCREEN-IMAGE BASED CLASSIFICATION

(71) Applicant: HEWLETT PACKARD ENTERPRISE DEVELOPMENT LP, Houston, TX (US)

(72) Inventors: Jin Wang, Wuhua District Shanghai (CN); Jun Lu, Wuhua District Shanghai (CN); Lingyan Meng, Wuhua District Shanghai (CN); Bing Gu, Wuhua District Shanghai (CN); Keke Qi, Wuhua District Shanghai (CN)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/329,806

(22) PCT Filed: Sep. 3, 2014

(86) PCT No.: PCT/CN2014/085794
§ 371 (c)(1),
(2) Date: Jan. 27, 2017

(87) PCT Pub. No.: WO2016/033744
PCT Pub. Date: Mar. 10, 2016

(65) Prior Publication Data
US 2017/0243228 A1    Aug. 24, 2017

(51) Int. Cl.
*G06Q 30/00* (2012.01)
*G06K 9/78* (2006.01)
(Continued)

(52) U.S. Cl.
CPC ......... *G06Q 30/016* (2013.01); *G06F 11/079* (2013.01); *G06F 11/0709* (2013.01);
(Continued)

(58) Field of Classification Search
None
See application file for complete search history.

(56) References Cited

U.S. PATENT DOCUMENTS 8,060,795 B2 * 11/2011 Bakekolo ............ G06F 11/0706
714/57
8,266,665 B2 * 9/2012 Beyabani ............. H04N 17/004
725/109

(Continued)

FOREIGN PATENT DOCUMENTS

CA    2435183    7/2002
CN    1492785    4/2004
(Continued)

OTHER PUBLICATIONS

International Search Report and Written Opinion for PCT/CN2014/085794, Completed by the Chinese Patent Office, dated Jun. 1, 2015, All together 12 Pages.

(Continued)

*Primary Examiner* — Andrae S Allison

(57) ABSTRACT

Role based assessment for an IT management system, includes maintaining a plurality of roles, each role attributable to a user type within an IT management system. Mappings are defined between the plurality of user roles and assets of the IT management system. An assessment for the IT management system is then assembled from the perspective of a selected one of the plurality of roles based on mappings between the selected user role and the assets.

20 Claims, 4 Drawing Sheets

(51) Int. Cl.
  *G06K 9/00*  (2006.01)
  *G06F 11/07*  (2006.01)
  *G06K 9/62*  (2006.01)
  *G06F 11/34*  (2006.01)
  *G06K 9/34*  (2006.01)
  *H04L 12/24*  (2006.01)

(52) U.S. Cl.
  CPC ...... *G06F 11/0751* (2013.01); *G06F 11/0775* (2013.01); *G06F 11/34* (2013.01); *G06K 9/00449* (2013.01); *G06K 9/6267* (2013.01); *G06K 9/78* (2013.01); *G06K 9/344* (2013.01); *H04L 41/5074* (2013.01)

(56) References Cited

U.S. PATENT DOCUMENTS

| | | | |
|---|---|---|---|
| 8,515,185 | B2 | 8/2013 | Lee et al. |
| 9,245,182 | B2 * | 1/2016 | Jania ................. G06K 9/00469 |
| 9,424,481 | B2 * | 8/2016 | Danko ................ G06F 16/5838 |
| 2002/0087950 | A1 * | 7/2002 | Brodeur ............. G06F 11/3636 717/124 |
| 2008/0219597 | A1 * | 9/2008 | Nakamura ........ G06F 17/30265 382/306 |
| 2011/0123115 | A1 * | 5/2011 | Lee ...................... G06K 9/036 382/185 |
| 2012/0075671 | A1 * | 3/2012 | Ogawa ............... H04N 1/00204 358/1.15 |
| 2013/0198166 | A1 * | 8/2013 | Prout ................ G06F 17/30442 707/718 |
| 2014/0195864 | A1 * | 7/2014 | Dempski ............. H04L 41/5074 714/57 |
| 2016/0044520 | A1 * | 2/2016 | Iyer ....................... H04W 24/08 370/252 |

FOREIGN PATENT DOCUMENTS

| | | | |
|---|---|---|---|
| EP | 1351781 | * | 1/2001 |
| EP | 1398726 | | 3/2004 |
| EP | 3221817 | A1 * | 11/2014 |

OTHER PUBLICATIONS

Augereau, O. et al., "Improving Classification of an Industrial Document Image Database by Combining Visual and Textual Features," Mar. 1, 2014, 6 pages, available at http://hal.archivesouvertes.fr/docs/00/94/67/12/PDF/bare_conf.pdf.

Diao, Y. et al., "Rule-based Problem Classification in IT Service Management," Sep. 30, 2009, 8 pages, available at http://jamjoom.net/publications/jamjoom-ICCC-09.pdf.

* cited by examiner

SCREEN-IMAGE BASED CLASSIFICATION

BACKGROUND

IT (Information Technology) management systems come in a variety of flavors. As examples, some are designed to manage lifecycles of software applications. Some are used to manage business services and monitor application and system performance within an IT infrastructure. Others are used to manage IT services. In each case, an IT management system utilizes records to represent different IT management entities. An IT service management system, for example, may maintain records each reflecting a service request.

DRAWINGS

DETAILED DESCRIPTION

Introduction:

When interacting with an IT management system, user tasks often rely on tools for creating records and tools for utilizing the records to complete tasks. Using an IT service management system as an example, users of managed services utilize the service management system to report errors and other conditions needing resolution. For each such report, an electronic record, often referred to as a ticket, may be created. Each ticket includes a number of fields that are populated with values so that each ticket conveys the information needed to reach a resolution.

A user may be alerted to a service condition by an notice such as an error screen or indicator presented in a graphical user interface. Once alerted to the condition, it can be difficult for users to navigate an IT service management system to select proper values for use in populating a ticket. This is especially true when the user is operating a mobile device such as a smart phone or tablet. Often, the user will not be able to easily identify the service at issue or accurately identify the condition.

Various examples described below allow a user to submit a screen-image of a user interface. A screen-image is a digital image capturing the contents of a user interface being displayed by a user device at a point in time. From that screen image, an IT management system can identify values for populating fields of an electronic record such as a ticket. In doing so, unstructured data from the screen-image is recognized. The unstructured data is processed against historical data. The unstructured data may be text that is analyzed to identify text elements. The historical data includes correlations between text elements, record fields, and corresponding values for those fields. Based on matches between the text elements and correlated text elements in the historical data, record fields and values for populating those fields are identified. Where, for example, the screen-image captures a condition such as an error with respect to a given service, that screen-mage can be processed along with historical data to identify multiple field values for a corresponding ticket. Those values can identify an affected service, a category consistent with that condition, and a ticket owner responsible for managing or otherwise processing the ticket to reach a resolution.

Figure 1:
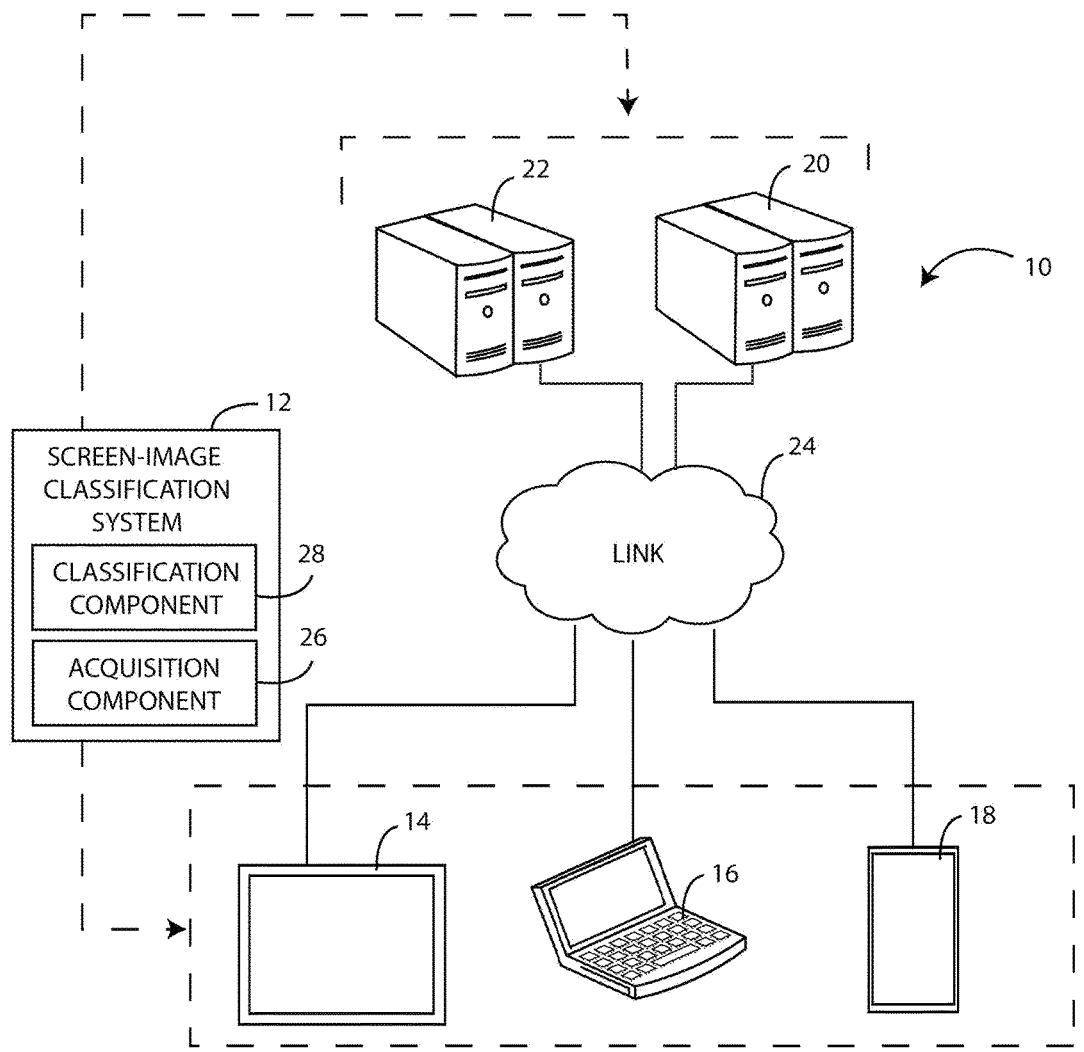
FIG. 1 is a block diagram depicting an example of a screen-image classification system within an example environment.
Figure 2:
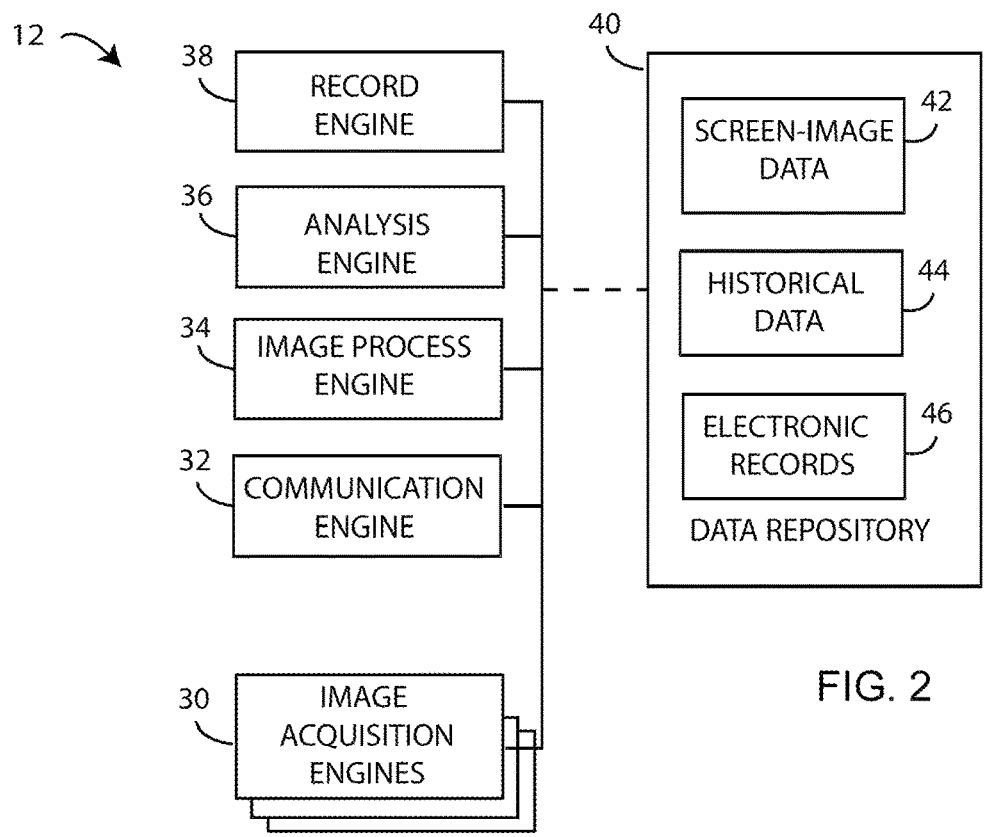
FIG. 2 is a block diagram depicting example components of a screen-image classification system.
Figure 3:
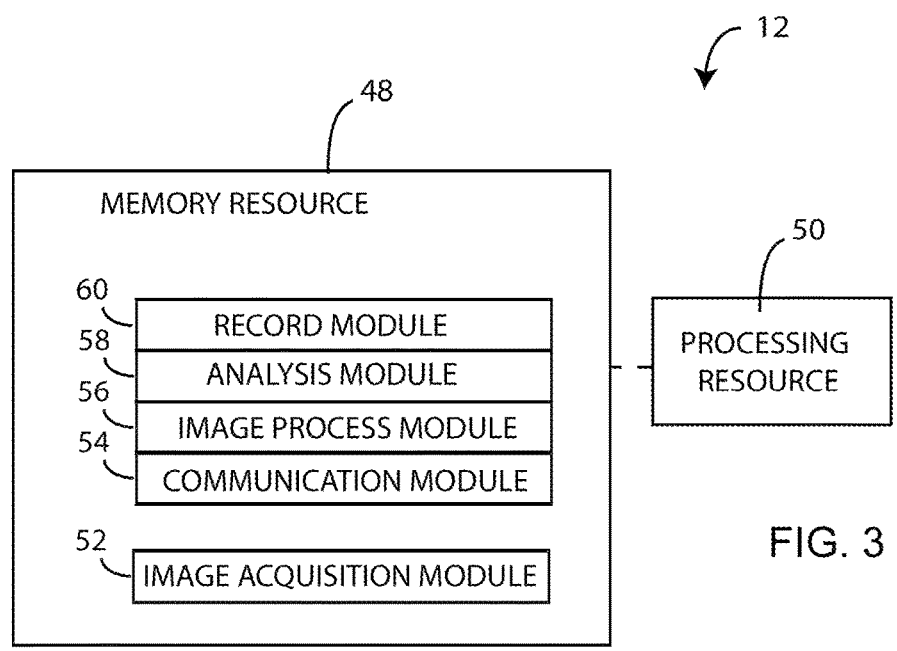
FIG. 3 is a block diagram depicting a memory resource and a processing resource for implementing the screen-image classification system of FIG. 2 according to an example.

Components:

FIGS. 1-3 depict examples of physical and logical components for implementing a screen-image based classification system. FIG. 1 depicts an example environment 10 in which embodiments may be implemented as screen-image classification system 12. In addition to system 12, environment 10 is shown to include user devices 14-18 and server devices 20-22. Each user device 14-18 represents a computing device configured to communicate with system 12 and consume services provided by server devices 20-22. In this example, user devices 14-18 are depicted as tablet device 14, laptop computer 16, and smart phone 18.

Server device 20 represents any number of computing devices capable of providing any number of services for consumption by user devices 14-18. Examples of services include email and other messaging services, database services, social networking, expense reporting and other human resource related services, and many others. Server device 22 represents any number of computing devices configured to provide one or more IT management services. Such can include services for managing the operation of server device 20 and services provided by server device 20.

Components 12-22 are interconnected via link 24. Link 24 represents generally any infrastructure or combination of infrastructures, wired and wireless, configured to enable electronic communication between components 12-22. For example, link 24 may represent the internet, one or more intranets, and any intermediate routers, switches, and other interfaces.

System 12, discussed in more detail below, represents a combination of hardware and programming configured to implement screen-image classification. System 12 is shown to include acquisition component 26 and classification component 28. Acquisition component 26 is responsible for acquiring screen images captured by user devices 14-18 and communicating those screen-images to classification component 28. Classification component 28 is responsible for processing screen-images communicated by acquisition component 26 to discern field values for populating electronic records utilized by an IT management service provided or otherwise implemented by service device 22. While shown as a separate component in environment 10, system 12 may be integrated within one or all of user devices 14-18. System 12 may be integrated in one or more of server devices 20-22 or another server device or user device not shown. System 12 may be distributed across any number of server devices 20-22, user devices 14-18 and other devices not shown. For example, acquisition component 26 may be implemented by each user device 14-18 while classification component 28 may be implemented by server device 22.

FIG. 2 is a block diagram depicting example complements of system 12. In FIG. 2, various components are identified as engines 30-38. In describing engines 30-38, focus is on each engine's designated function. However, the term engine, as used herein, refers to a physical combination of hardware and programming configured to perform a designated function. As is illustrated later with respect to FIG. 3, the hardware of each engine, for example, may include one or both of a processing device and a memory device, while the programming is code stored on that memory device and executable by the processing device to perform the designated function.

Continuing with FIG. 2, system 12 is shown to include image acquisition engines 30, communication engine 32, image process engine 34, analysis engine 36, and ticket engine 38. In performing their respective functions, engines 30-38 may access data repository 40. Repository 40 represents generally any storage memory accessible to system 12 that can be used to store and retrieve data. With reference back to FIG. 1, acquisition component 26 corresponds to image acquisition engines 30 and classification component corresponds to engines 32-38.

Image acquisition engines 30 are each responsible for initiating, with respect to a given user device, communication of screen-images for acquisition by the communication engine 32. Each image acquisition engine 30 may, for example, be configured to cause a corresponding user device to capture a screen-image or otherwise access a screen-image previously captured by that user device and then initiate communication of that screen-image to communication engine 32. The communication may be directly to communication engine 32 or to data repository 40 from which communication engine 32 may access the screen-image from screen-image data 42.

Communication engine 32 is responsible for acquiring screen-images. The screen-images may be acquired as a result of a communication initiated by image acquisition engines 30. Thus, communication engine 32 may acquire the screen-images directly from image acquisition engines 30 or from data repository 40. Image process engine 34 is configured to recognize or otherwise discern text elements within each acquired screen-image. For example, image process engine 34 may perform optical character recognition to identify text within each screen-image. From the recognized text, image process engine 36 may then recognize text elements. Text elements are words and phrases that may be indicative of field values to be used to populate an electronic record. In doing so, image process engine 34 may compare the recognized text to a library containing such words and phrases. Such a library may be part of historical data 44.

Analysis engine 34 is responsible for processing the text elements recognized within each screen-image against a collection of historical data 44 to discern a plurality of different field values corresponding to that screen-image. The field values are values to be used to populate selected fields of an electronic record. That record, for example, may be a ticket for use by an IT service management system. The field values may then identify a particular service and a category consistent with a condition for that service. That condition may be an error condition as indicated in a given screen-image.

The historical data 44 is a collection of electronic information assembled over time that can be processed along with text elements recognized from screen-images to discern field values. In an example, the historical data 44 includes previously identified correlations between text elements and field values for use in populating electronic records. Where, for example, an electronic record is a ticket for an IT service management system, the correlations may be between text elements, managed services, and categories consistent with various possible conditions of those managed services.

Analysis engine 36 may also be configured to, for each acquired screen-image, utilize the plurality of field values discerned for that screen-image to discern a record owner from among a plurality of record owners. A record owner is an individual or service selected to utilize or consume an electronic record populated with field values discerned from text elements recognized from a screen-image. Were, for example, the electronic record is a ticket for an IT service management system, the record owner may me an individual responsible for resolving a condition experienced by a user of a managed service. Here, analysis engine 36 may utilize the historical data 44 or other data that correlates field values with record owners to identify the record owner.

Record engine 38 is responsible for maintaining an electronic record for each acquired screen-image such that the record is defined, at least in part, by the different field values discerned for that screen-image. In performing its function, record engine 38 may generate a new electronic record within electronic records 46 or update an existing record within electronic records 46.

In addition to acquiring screen-images, communication engine 32 may be configured to, for each electronic record maintained by the record engine 38, initiate a communication addressed to the record owner discerned for that electronic record. That communication includes data indicative of the electronic record. As examples, communication engine 38 may initiate the sending of an electronic message alerting the record owner. Communication engine 32 may communicate the electronic record to a corresponding IT management system so that it may appear in a collection of records assigned to that record owner.

In the foregoing discussion, engines 30-38 were described as combinations of hardware and programming. Engines 30-38 may be implemented in a number of fashions. Looking at FIG. 3, the programming may be processor executable instructions stored on tangible memory resource 48 and the hardware may include processing resource 50 for executing those instructions. Thus memory resource 48 can be said to store program instructions that when executed by processing resource 50 implements system 12 of FIG. 2.

Memory resource 48 represents generally any number of memory components capable of storing instructions that can be executed by processing resource 50. Memory resource 48 is non-transitory in the sense that it does not encompass a transitory signal but instead is made up of more or more memory components configured to store the relevant instructions. Memory resource 48 may be implemented in a single device or distributed across devices. Likewise, processing resource 50 represents any number of processors capable of executing instructions stored by memory resource 50. Processing resource 50 may be integrated in a single device or distributed across devices. Further, memory resource 48 may be fully or partially integrated in the same device as processing resource 50, or it may be separate but accessible to that device and processing resource 50.

In one example, the program instructions can be part of an installation package that when installed can be executed by processing resource 50 to implement system 76. In this case, memory resource 48 may be a portable medium such as a CD, DVD, or flash drive or a memory maintained by a server from which the installation package can be downloaded and installed. In another example, the program instructions may be part of an application or applications already installed. Here, memory resource 48 can include integrated memory such as a hard drive, solid state drive, or the like.

In FIG. 3, the executable program instructions stored in memory resource 48 are depicted as image acquisition, communication, image process, analysis, and record modules 52-60 respectively. Image acquisition module 52 represents program instructions that, when executed, cause processing resource 50 to implement image acquisition engines 30. Here, for example, processing resource 50 may include the processors of the one or more user devices. Communication module 54 represents program instructions that, when executed, cause processing resource 50 to implement communication engine 32. Image process module 56 represents program instructions that, when executed, cause processing resource 50 to implement image process engine 34. Analysis module 58 represents program instructions that, when executed, cause processing resource 50 to implement analysis engine 36. Record module 60 represents program instructions that, when executed, cause processing resource 50 to implement record engine 38. With respect to modules 54-60, the processing resource may include one or more processors of one or more servicer devices, one or more user devices, or a combination thereof.

Figure 4:
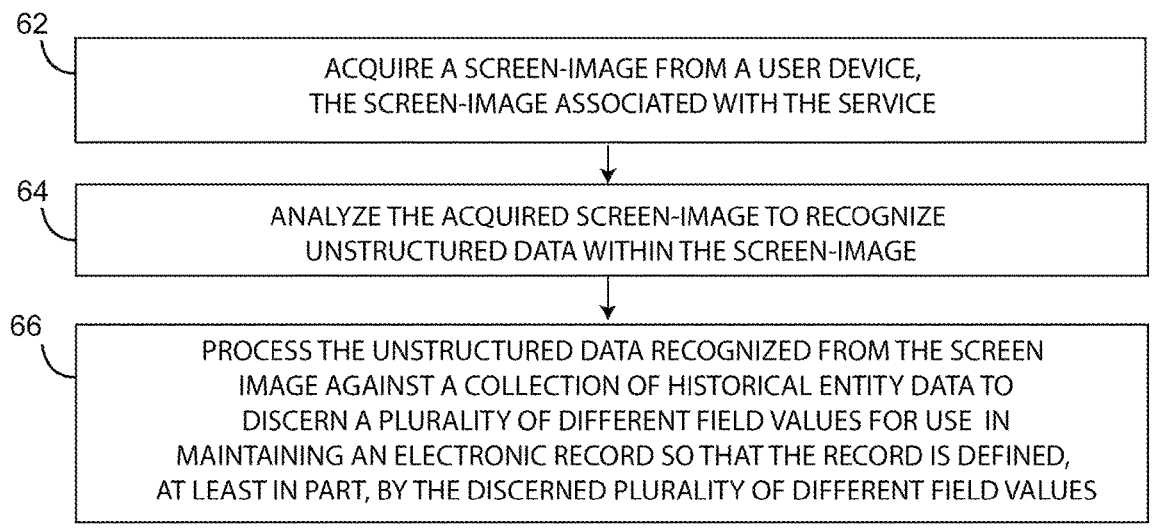
FIG. 4 is a flow diagram depicting actions taken to implement an example.
Figures 5, 6:
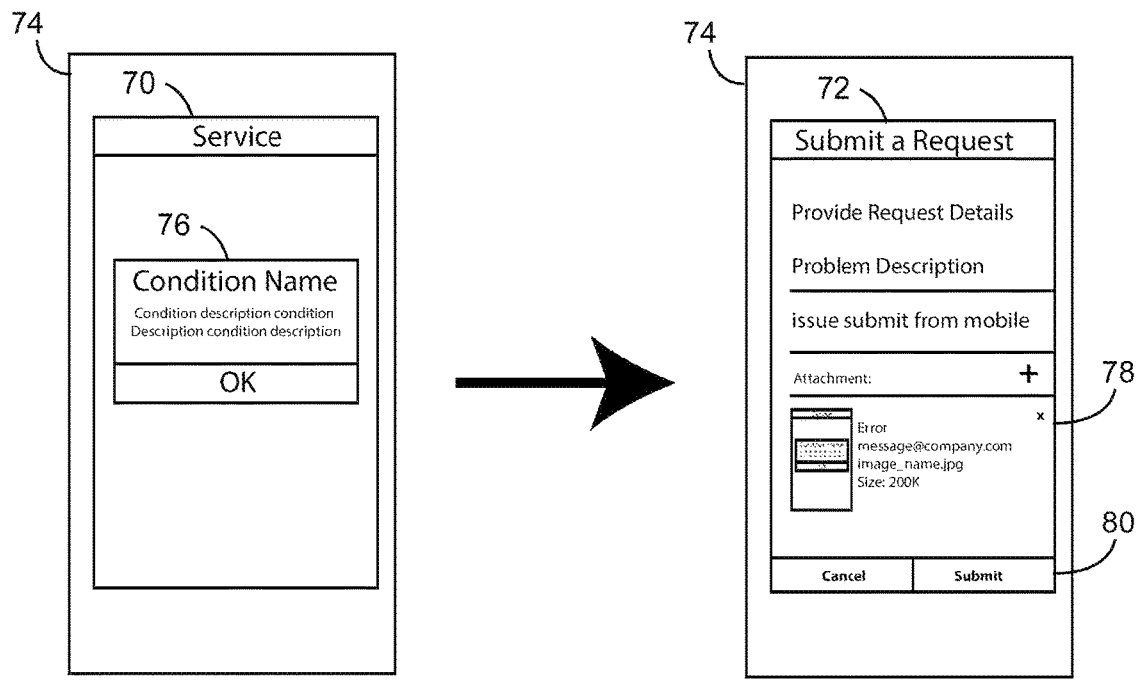
FIG. 5 depicts a sequence of screen views of a user device being used to submit a service request according to an example.
FIG. 6 is a screen view depicting an example of a ticket generated as a result of the service request submission of FIG. 5.

Operation:

FIG. 4 is a flow diagram of actions taken to implement a method for evaluating user interface efficiency. FIGS. 5 and 6 depict screen images for providing additional context in the form of an example use case for the method depicted in FIG. 4. In discussing FIGS. 4-6, reference may be made to components depicted in FIGS. 1-3. Such reference is made to provide contextual examples and not to limit the manner in which the method depicted by FIG. 4 may be implemented.

Starting with FIG. 4, a screen-image is acquired (block 62). That screen image is associated with a particular service being consumed or otherwise utilized by a user device. The screen-image captures contents of a user interface being displayed by the user device at a point in time. Referring back to FIG. 2, communication engine 32 may be responsible for implementing block 62 by receiving a communication containing the screen-image or by accessing the screen-image from data store 40.

The acquired screen-image is processed to recognize unstructured data within that screen-image (block 64). Such may be accomplished using optical character recognition. The unstructured data recognized from the screen-image against a collection of historical data to discern a plurality of different field values (block 66). Those field values are for use in maintaining an electronic record so that the record is defined, at least in part, by the discerned plurality of different field values. Here, the unstructured data can include text that can be processed to identify text elements related to the service. Those text elements can be processed against the historical data to discern the field values. The historical data may include a plurality of correlations between text elements and field values. Here, by matching text elements recognized from the screen-image to text elements of the historical data's correlations, corresponding field values can be discerned. Referring to FIG. 2, block 64 may be performed by image process engine 34 and block 66 may be performed by analysis engine 36. While not depicted in FIG. 4, the method may also include maintaining an electronic record using the field values discerned in block 66. Such may be implemented by record engine 38 of FIG. 2.

Utilizing the discerned plurality of different field values, a record owner value may be identified. The identified record owner value is used to maintain the electronic record so that it is defined, at least in part, by the discerned plurality of different field values and that record owner value. A communication may then be initiated such that the communication is addressed according to the record owner value. The communication includes data indicative of the electronic record as defined by the discerned plurality of different field values.

The screen-image acquired in block 62 may be associated with one of a plurality of managed services. The unstructured data recognized in block 64 may include text elements indicative of one of a plurality of conditions of that service. The plurality of field values discerned in block 66 can then include a first value indicative of the one of the plurality of managed services and a second value indicative of a category consistent with the one of the plurality of conditions.

Looking now at the Screen images of FIGS. 5 and 6 an example use case is described to provide additional context for the method depicted in FIG. 4. Starting with FIG. 5, two user interfaces 70 and 72 displayed by a user device 74 at different times are depicted. User interface 70 is for a service with which user device is interacting. User interface 70 includes content 76 reflective of a condition of that service. Here that condition may be an error being experienced by a user of device 74. That user may then cause the device to capture that user-interface as a screen-image.

User interface 72 is that of an image acquisition function provided, for example, by an image acquisition engine 30 of FIG. 2. Via user interface 72, a user may utilize control 78 to attach the captured screen-image of user interface 70. Control 80 can then be used to initiate a communication of the attached screen-image to, for example, communication engine 32 or data store 40 of FIG. 2.

FIG. 6 depicts a user interface 82 of a service management tool provided by an IT service management system. User interface depicts a text box 84 and a number of fields including fields 86-88. Using the method of FIG. 4, the screen image caused to be communicated through user interface 72 of FIG. 5 is processed. Through that processing, field values are identified and used to automatically populate fields 86-90. The recognized unstructured data is used to automatically populate text box 84. Here those field values identify a service, a category reflective of a condition represented by content 76 of FIG. 5, and record owner.

In the use case represented by FIGS. 5 and 6, a user need only capture and submit a screen-image of a service experiencing a condition for which the user is requesting a resolution. That screen-image is then used to automatically populate an electronic record such as a ticket that can then be used to manage the user's request.

Conclusion:

FIGS. 1-3 aid in depicting the architecture, functionality, and operation of various embodiments. In particular, FIGS. 1-3 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagram of FIG. 4 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for screen-image based record classification, comprising:
   acquiring a screen-image from a user device, the screen-image of a graphical user interface associated with an information technology (IT) service;
   analyzing, by a processor, the acquired screen-image to recognize unstructured data within the screen-image;
   processing, by the processor, the unstructured data recognized from the screen-image against a database of historical data to discern a plurality of different field values; and
   automatically maintaining, by the processor, an electronic record associated with the IT service based on the discerned plurality of different field values, wherein the electronic record is a ticket of an IT management system.

2. The method of claim 1, comprising,
   utilizing the discerned plurality of different field values to identify a record owner value for use in maintaining the electronic record defined, at least in part, by the discerned plurality of different field values and the record owner value.

3. The method of claim 2, further comprising initiating a communication addressed according to the record owner value, the communication including data indicative of the electronic record as defined by the discerned plurality of different field values.

4. The method of claim 1, wherein:
   the screen-image is a screen-image associated with one of a plurality of managed IT services;
   the unstructured data includes text elements indicative of one of a plurality of conditions of the IT service; and
   the discerned plurality of field values include a first value indicative of the one of the plurality of managed IT services and a second value indicative of an entity category consistent with the one of the plurality of conditions.

5. The method of claim 4, wherein:
   the historical data includes a number of correlations between text elements, the plurality of managed IT services, and a number of categories; and
   processing the unstructured data recognized from the screen-image comprises processing the recognized text elements against the number of correlations to discern the first and second values.

6. The method of claim 1, wherein the acquired screen-image shows an error message displayed in the graphical user interface of the IT service.

7. The method of claim 1, wherein the database of historical data comprises a plurality of correlations between text elements and field values.

8. A non-transitory memory resource storing instructions that, when executed, cause a processing resource to implement a system for screen-image based classification, the instructions comprising:
   an image module executable to recognize text elements within each of a plurality of screen-images captured by a plurality of user devices, the plurality of screen-images of graphical user interfaces associated with at least one managed information technology (IT) service;
   an analysis module executable to, for each of the plurality of screen-images, process the text elements recognized within that screen-image against a database of historical ticket data to discern a plurality of different ticket field values corresponding to that screen-image;
   a ticket module executable to, for each of the plurality of screen-images, maintain an electronic ticket associated with the at least one managed IT service based on the plurality of different ticket field values discerned for that screen-image.

9. The memory resource of claim 8, wherein:
   the analysis module is executable to, for each of the plurality of screen-images, utilize the discerned plurality of different ticket field values to discern a ticket owner from among a plurality of ticket owners;
   the ticket module is executable to, for each of the plurality of screen-images, maintain an electronic ticket so that the ticket is defined, at least in part, by the discerned plurality of different ticket field values and the discerned ticket owner; and
   the instructions further comprising a communication module executable to, for each electronic ticket maintained by the ticket module, initiate a communication addressed to the ticket owner discerned for that electronic ticket, the communication including data indicative of that electronic ticket.

10. The memory resource of claim 8, wherein:
    each of the plurality of screen-images is associated with one of a plurality of managed IT services and is indicative of one of a plurality of conditions; and
    for each of the plurality of screen-images, the discerned plurality of ticket field values include a first value indicative of one of the plurality of managed IT services and a second value indicative of a ticket category consistent with the condition indicated by that screen-image.

11. The memory resource of claim 10, wherein:
    the historical ticket data includes a number of correlations between text elements, the plurality of managed IT services, and a number of categories; and
    the analysis module is executable to, for each screen-image, process the text elements recognized from that screen-image against the number of correlations to discern the first and second values.

12. The memory resource of claim 8, wherein at least one screen-image of the plurality of screen-images shows an error message displayed in a first graphical user interface of a first managed IT service, and wherein the database of historical data comprises a plurality of correlations between text elements and field values.

13. A system for screen-image based classification, the system comprising a communication engine, an image process engine, an analysis engine, and a record engine, wherein:
the communication engine is configured to acquire screen-images from user devices, the screen-images of graphical user interfaces associated with at least one managed information technology (IT) service;
the image process engine is configured to recognize text elements within each acquired screen-image;
the analysis engine is configured to, for each acquired screen-image, process the text elements recognized within that screen-image against a collection of historical data to discern a plurality of different field values corresponding to that screen-image;
the record engine is configured to, for each acquired screen-image, maintain an electronic record associated with the at least one managed IT service based on the plurality of different field values discerned for that screen-image, wherein the electronic record is a ticket of an IT management system.

14. The system of claim 13, wherein the historical data includes a plurality of correlations between text elements, a plurality of managed IT services, and a plurality of categories; and
the analysis engine is configured to, for each acquired screen-image, process the text elements recognized from that screen-image against the plurality of correlations to discern the plurality of different field values.

15. The system of claim 14, wherein:
each acquired screen-image is associated with one of the plurality of managed IT services and is indicative of one of a plurality of conditions; and
the plurality of field values discerned for each screen-image include a first value indicative of one of the plurality of managed services and a second value indicative of a category consistent with the condition indicated by that screen-image.

16. The system of claim 14, wherein:
the analysis engine is configured to, for each acquired screen-image, utilize the plurality of field values discerned for that screen-image to discern a record owner from among a plurality of record owners;
the record engine is executable to, for each acquired screen-image, maintain an electronic record so that the record is defined, at least in part, by the discerned plurality of field values and the discerned record owner.

17. The system of claim 16, wherein the communication engine is configured to, for each electronic record maintained by the record engine, initiate a communication addressed to the record owner discerned for that electronic record, the communication including data indicative of that electronic record.

18. The system of claim 13, further comprising a image acquisition engines each configured to initiate communications of screen-images for receipt by the communication engine, each remote image device corresponding to a different user device.

19. The system of claim 13, wherein at least one screen-image of the plurality of screen-images shows an error message displayed in a first graphical user interface of a first managed IT service.

20. The system of claim 13, wherein the collection of historical data comprises a plurality of correlations between text elements and field values.

* * * * *